(12) United States Patent
Nakamura et al.

(10) Patent No.: US 10,255,494 B2
(45) Date of Patent: Apr. 9, 2019

(54) INFORMATION PROCESSING APPARATUS, INFORMATION PROCESSING METHOD, AND NON-TRANSITORY COMPUTER READABLE MEDIUM

(71) Applicant: FUJI XEROX CO., LTD., Tokyo (JP)

(72) Inventors: Shinya Nakamura, Kanagawa (JP); Naoyuki Enomoto, Kanagawa (JP); Yozo Kashima, Kanagawa (JP); Yusuke Suzuki, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 203 days.

(21) Appl. No.: 14/991,200

(22) Filed: Jan. 8, 2016

(65) Prior Publication Data

US 2017/0076150 A1    Mar. 16, 2017

(30) Foreign Application Priority Data

Sep. 14, 2015   (JP) .................................. 2015-180539

(51) Int. Cl.
   *G06K 9/00*   (2006.01)
   *G09B 7/00*   (2006.01)
   *G06K 9/20*   (2006.01)

(52) U.S. Cl.
   CPC ..... *G06K 9/00409* (2013.01); *G06K 9/00402* (2013.01); *G06K 9/00449* (2013.01); *G06K 9/2054* (2013.01); *G09B 7/00* (2013.01); *G06K 2209/01* (2013.01)

(58) Field of Classification Search
   CPC ........... G06K 9/00409; G06K 9/00402; G06K 9/00449; G06K 9/2054; G06K 2209/01; G09B 7/00
   See application file for complete search history.

(56) References Cited

U.S. PATENT DOCUMENTS

2001/0028737 A1* 10/2001 Takakura .................. G06T 7/11
                                                    382/162
2001/0036314 A1* 11/2001 Yamaguchi .............. G06K 9/38
                                                    382/172

(Continued)

FOREIGN PATENT DOCUMENTS

JP          5-8671 U      2/1993
JP      2002-245207 A     8/2002
JP      2006-201936 A     8/2006

OTHER PUBLICATIONS

Jan. 26, 2018 Office Action issued in European Patent Application No. 16159373.6.

(Continued)

*Primary Examiner* — Nathan Hillery
(74) *Attorney, Agent, or Firm* — Oliff PLC

(57) ABSTRACT

An information processing apparatus includes an acquisition unit that acquires image information of an image of an original document, a recognition unit that recognizes from the image information acquired by the acquisition unit each of plural entry items and an entry remark written differently from the plural entry items, included in the image, and an associating unit that associates the entry remark with one of the entry items in accordance with a relationship between a location of the entry items recognized by the recognition unit and a location of the entry remark.

10 Claims, 12 Drawing Sheets

(56) References Cited

U.S. PATENT DOCUMENTS

| | | | | |
|---|---|---|---|---|
| 2002/0114515 | A1* | 8/2002 | Hotta | G06K 9/2054 |
| | | | | 382/177 |
| 2003/0036047 | A1* | 2/2003 | Okubo | G06Q 30/02 |
| | | | | 434/350 |
| 2005/0164155 | A1* | 7/2005 | Okubo | G06Q 30/02 |
| | | | | 434/362 |
| 2006/0160054 | A1 | 7/2006 | Onishi et al. | |
| 2006/0188863 | A1* | 8/2006 | Koyama | G09B 7/02 |
| | | | | 434/350 |
| 2006/0194188 | A1* | 8/2006 | Saito | G09B 7/02 |
| | | | | 434/353 |
| 2006/0221410 | A1* | 10/2006 | Suzuki | H04N 1/409 |
| | | | | 358/463 |
| 2006/0289625 | A1* | 12/2006 | Tamune | G09B 1/00 |
| | | | | 235/375 |
| 2006/0291723 | A1* | 12/2006 | Koyama | G06K 9/342 |
| | | | | 382/181 |
| 2008/0311551 | A1* | 12/2008 | Reed | G06K 9/2063 |
| | | | | 434/356 |
| 2011/0222795 | A1* | 9/2011 | Niina | G06K 9/00456 |
| | | | | 382/309 |
| 2012/0237131 | A1* | 9/2012 | Ito | G06K 9/2063 |
| | | | | 382/229 |

OTHER PUBLICATIONS

Jan. 14, 2019 Office Action issued in Chinese Patent Application No. 201610132832.8.

\* cited by examiner

FIG. 4

ORIGIN O • → x y ↓

| DATE OF EXAMINATION | AUGUST 5, 2015 | | TOTAL SCORE | | EXAMINEE NUMBER | a | 0 | 0 | 0 | 6 |
|---|---|---|---|---|---|---|---|---|---|---|
| EXAMINATION SUBJECT | MATH | | 4 | 8 | NAME | DDDD | | | | |

QUESTION 1

ANSWER TO QUESTION 1

5

QUESTION 2

ANSWER TO QUESTION 2

6

QUESTION 3

ANSWER TO QUESTION 3

13

QUESTION 4

ANSWER TO QUESTION 4

24

PARTIAL SCORE REGION

FIG. 12

| ITEM NO. | AGGREGATE PROCESS RESULTS | EXAMINEE NO. (OCR) | EXAMINEE NO. (IMAGE) | NAME (IMAGE) | TOTAL SCORE (OCR) | TOTAL SCORE (IMAGE) | SCORE 1 (OCR) | SCORE 1 (IMAGE) | SCORE 2 (OCR) | SCORE 2 (IMAGE) | SCORE 3 (OCR) | SCORE 3 (IMAGE) | SCORE 4 (OCR) | SCORE 4 (IMAGE) |
|---|---|---|---|---|---|---|---|---|---|---|---|---|---|---|
| 1 | SUCCESSFULLY ENDED | a0001 | a0001 | AAAA | 77 | 77 | 15 | 15 | 21 | 21 | 34 | 34 | 7 | 7 |
| 2 | SUCCESSFULLY ENDED | a0004 | a0004 | BBBB | 53 | 53 | 8 | 8 | 16 | 16 | 20 | 20 | 9 | 9 |
| 3 | SUCCESSFULLY ENDED | a0005 | a0005 | CCCC | 102 | 102 | 16 | 16 | 30 | 30 | 21 | 21 | 35 | 35 |

EXAMINEE NO. / NAME / TOTAL SCORE / PARTIAL SCORES

INFORMATION PROCESSING APPARATUS, INFORMATION PROCESSING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2015-180539 filed Sep. 14, 2015.

BACKGROUND

Technical Field

The present invention relates to an information processing apparatus, an information processing method, and a non-transitory computer readable medium.

SUMMARY

According to an aspect of the invention, there is provided an information processing apparatus. The information processing apparatus includes an acquisition unit that acquires image information of an image of an original document, a recognition unit that recognizes from the image information acquired by the acquisition unit each of plural entry items and an entry remark written differently from the plural entry items, included in the image, and an associating unit that associates the entry remark with one of the entry items in accordance with a relationship between a location of the entry items recognized by the recognition unit and a location of the entry remark.

BRIEF DESCRIPTION OF THE DRAWINGS

Exemplary embodiments of the present invention will be described in detail based on the following figures, wherein:

FIG. 4 illustrates an example of a marked examination paper of the exemplary embodiment;

FIG. 12 is an example of a file for a marker generated in the fourth process;

DETAILED DESCRIPTION

Exemplary embodiments of the present invention are described below with reference to the drawings.

Figure 1:
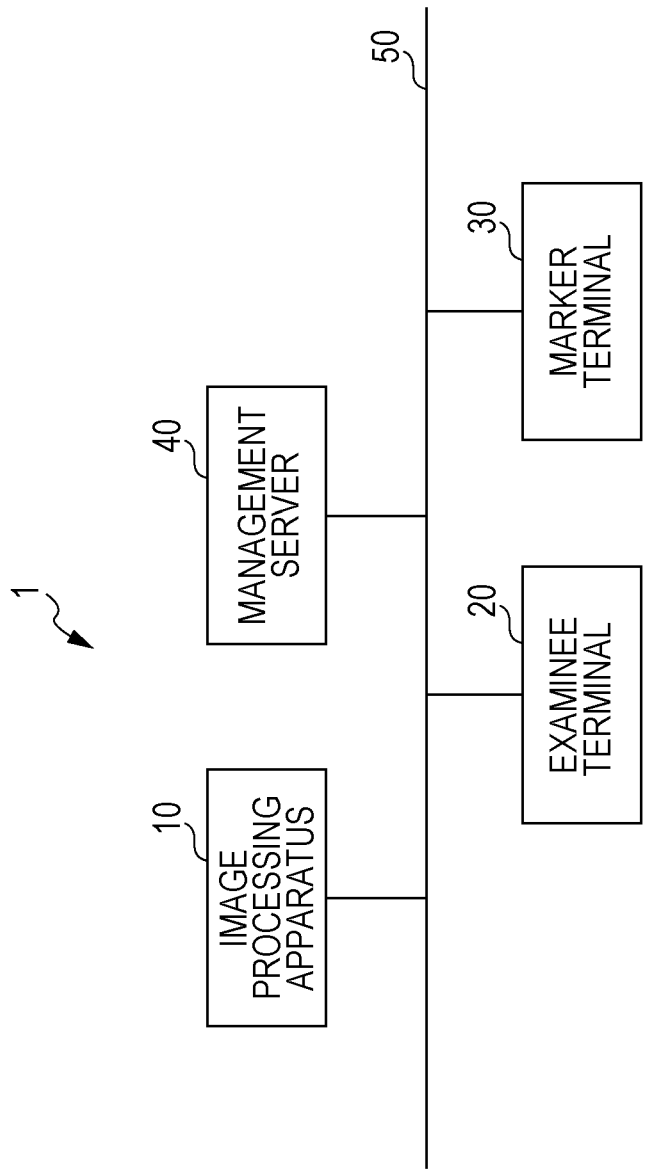
FIG. 1 is a block diagram generally illustrating an image processing system of an exemplary embodiment.

An entire configuration of an image processing system 1 of an exemplary embodiment is described first. FIG. 1 is a block diagram generally illustrating the image processing system 1 of the exemplary embodiment. The image processing system 1 of the exemplary embodiment reads an examination paper of a test, and collects the marked results of the examination paper. Referring to FIG. 1, the image processing system 1 includes an image processing apparatus 10, an examinee terminal apparatus 20, a marker terminal apparatus 30, and a management server 40 with these apparatuses interconnected to each other via a network 50.

The image processing apparatus 10 has a scanning function, and reads an image formed on an original document (paper sheet), generates image data indicating the read image, and performs an operation on the generated image data. The image processing apparatus 10 may be a scanner device. The image processing apparatus 10 may be a charge-coupled device (CCD) system that converges, through a lens, light reflected from an original document and receives a converged light beam on a CCD when a light beam is emitted onto the original document, or a contact image sensor (CIS) system that receives a light beam reflected from the original document when a light-emitting diode (LED) successively emits a light beam onto the original document. The image processing apparatus 10 may have a print function, a copy function and a facsimile function, in addition to the scanning function. In the exemplary embodiment, the image processing apparatus 10 is an example of an information processing apparatus.

The examinee terminal apparatus 20 is a computer that is provided to be operated by an examinee, such as a university student, who takes a test. The examinee terminal apparatus 20 may be a personal computer (PC), for example.

The marker terminal apparatus 30 is a computer that is provided to be operated by a marker, such as university teaching staff who marks an examination paper. The marker terminal apparatus 30 may be a PC.

The management server 40 stores and manages data exchanged over the network 50. The management server 40 is typically a server apparatus used in a learning management system (LMS). The LMS centrally manages the delivery of learning material and scores of tests. For example, an examinee may view the learning material and test score delivered by the management server 40, using the examinee terminal apparatus 20. The marker may view the test score of each examinee delivered by the management server 40, or upload the learning material to the management server 40, using the marker terminal apparatus 30.

The network 50 is used to exchange a variety of information. The network 50 may be the Internet or a local area network (LAN).

In the exemplary embodiment, the examination paper of each examinee is marked by the marker, and the marked examination paper is placed on the image processing apparatus 10. The image processing apparatus 10 reads the image formed on the placed examination paper, collects the marked results, and notifies the examinee and the marker of the collected marked results. A question described in the examination paper and an answer to the question are hereinafter collectively referred to as "question-answer pair". The image processing apparatus 10 of the exemplary embodiment collects a score in response to each question-answer pair in the examination paper as the marked results, and notifies each examinee and the marker of the score of each question-answer pair collected.

In accordance with the exemplary embodiment, at least one of the question or the answer to the question serves as an example of an entry item. A score (partial score) of the question-answer pair serves as an example of an entry remark.

FIG. 1 illustrates a single examinee terminal apparatus 20, but two or more examinee terminal apparatuses 20 may be used. Also, FIG. 1 illustrates a single marker terminal apparatus 30, but two or more marker terminal apparatuses 30 may be used.

Figure 2:
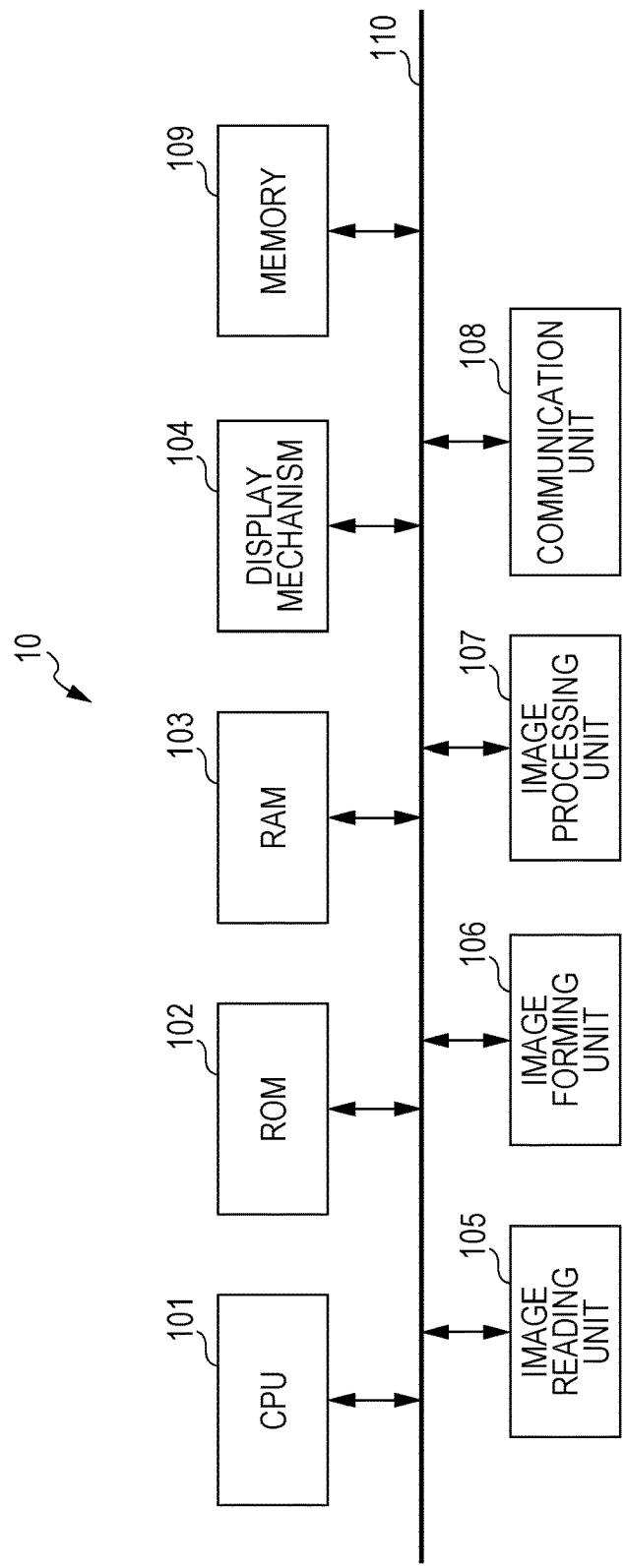
FIG. 2 illustrates a hardware configuration of an image processing apparatus of the exemplary embodiment.

The hardware configuration of the image processing apparatus 10 is described below. FIG. 2 illustrates the hardware configuration of the image processing apparatus 10 of the exemplary embodiment. The image processing apparatus 10 of the exemplary embodiment includes a central processing unit (CPU) 101, a read-only memory (ROM) 102, a random-access memory (RAM) 103, a display mechanism 104, an image reading unit 105, an image forming unit 106, an image processing unit 107, a communication unit 108, and a memory 109. These elements are interconnected to each other via a bus 110, and exchange data via the bus 110.

The CPU 101 executes a variety of software programs including an operating system (OS) and applications. The ROM 102 stores a control program to be executed by the CPU 101. The CPU 101 reads the control program from the ROM 102, and executes the control program on the RAM 103 serving as a working area. When the CPU 101 executes the control program, the functions of the image processing apparatus 10 are performed.

The display mechanism 104 includes a liquid-crystal touchpanel display, for example, and displays data related to the image processing apparatus 10 thereon. The display mechanism 104 detects a touching of a user on the displayed screen, thereby receiving an operation from the user. A device to detect the touching includes, but is not limited to, a device configured to detect the touching on the basis of pressure caused by the touching and a device configured to detect the touching on the basis of static electricity of an object that comes to be in contact with the screen.

The image reading unit 105 reads an image formed on an original document, and generates image data representing the read image.

The image forming unit 106 includes a printing mechanism that forms an image on a recording medium, such as a paper sheet. The image forming unit 106 may be a printer, for example, and may be an electrophotographic system that forms an image by transferring a tonner image attached to a photoconductor drum to a recording medium, or an ink jet system that forms an image by ejecting ink onto the recording medium.

The image processing unit 107 performs an image processing operation, including color correction and gradation correction, on the input image data, and thus generates and outputs image-processed image data to the image forming unit 106.

The communication unit 108 works as a communication interface to transmit and receive a variety of data to and from another apparatus (such as the examinee terminal apparatus 20 or the marker terminal apparatus 30) via the network 50.

The memory 109 includes a storage area, such as a hard disk device, and stores data received by the communication unit 108 and data generated by the image processing apparatus 10.

Figure 3:
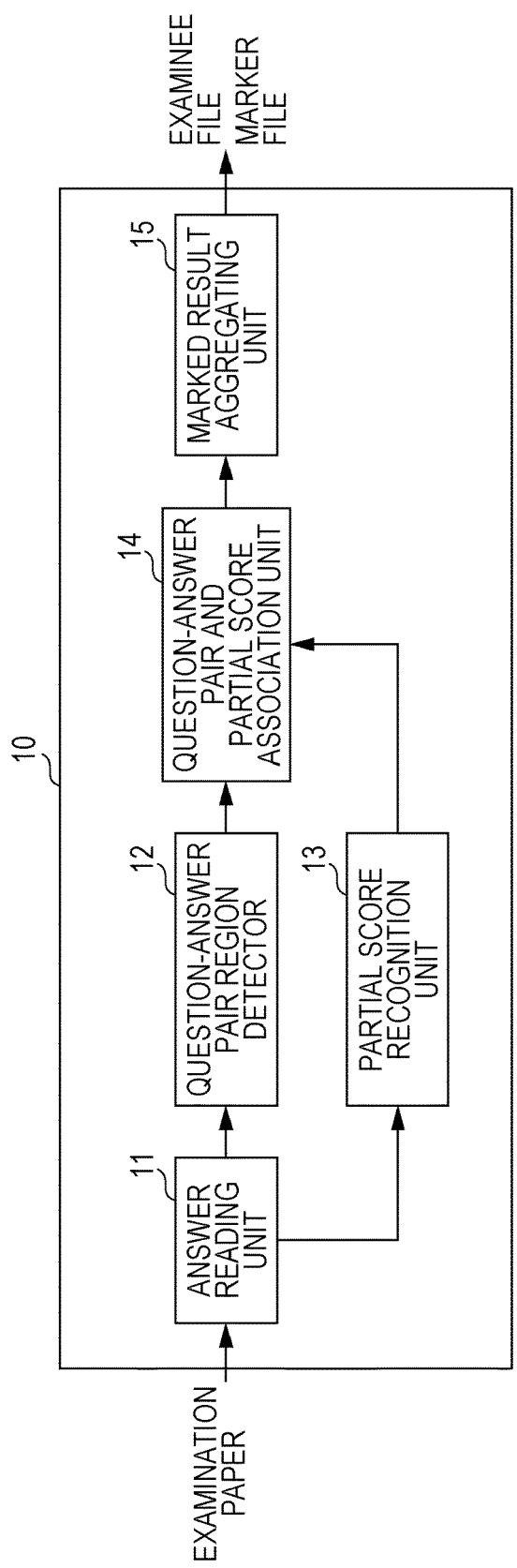
FIG. 3 illustrates a functional configuration of the image processing apparatus of the exemplary embodiment.

The functions and configuration of the image processing apparatus 10 are described below. FIG. 3 is a functional block diagram illustrating the image processing apparatus 10 of the exemplary embodiment. The image processing apparatus 10 includes an answer reading unit 11 that reads an image formed on the placed examination paper, a question-answer pair region detector 12 that detects a region of each question-answer pair in the examination paper from the read image, and a partial score recognition unit 13 that recognizes a partial score described in the examination paper from the read image. The image processing apparatus 10 further includes a question-answer pair and partial score association unit 14 that associates the question-answer pair with the partial score, and a marked result aggregating unit 15 that associates the examinee with the marked results.

The answer reading unit 11 reads the image formed in the examination paper marked and placed on the image processing apparatus 10, and acquires image information (image data).

The question-answer pair region detector 12 detects the region of each question-answer pair in the examination paper in accordance with the image information read and acquired by the answer reading unit 11. In other words, from the image information read by the answer reading unit 11, the question-answer pair region detector 12 recognizes a region having each of the multiple questions written thereon in the examination paper, and a region having each of the answers responsive to the questions.

The partial score recognition unit 13 recognizes a partial score written in the examination paper based on the image information read and acquired by the answer reading unit 11. More specifically, the partial score recognition unit 13 recognizes characters written on a region different from the region where the question-answer pair is written, through optical character recognition (OCR) as a character recognition technique. For example, the character recognition may be performed on a region predetermined as a region where a partial score associated with the question-answer pair is written (hereinafter referred to as a partial score region). The partial score recognition unit 13 recognizes the recognized character information as a partial score if the recognized character information is a number.

The question-answer pair and partial score association unit 14 associates the question-answer pair detected by the question-answer pair region detector 12 with the partial score recognized by the partial score recognition unit 13. In other words, the question-answer pair and partial score association unit 14 associates the recognized partial score with one of the multiple question-answer pairs in accordance with the relationship between regions of the question-answer pairs detected by the question-answer pair region detector (locations of the multiple question-answer pairs) and the location of the partial score recognized by the partial score recognition unit 13.

The marked result aggregating unit 15 associates information related to an examinee with marked results of the examinee. More specifically, the question-answer pair and partial score association unit 14 collects partial scores of the question-answer pairs, and generates a file that associates the partial score of the collected question-answer pair with the information of the examinee who has written his or her answer in the examination paper. For example, the question-answer pair and partial score association unit 14 generates a file recording partial scores responsive to question-answer pairs on a per examinee basis, as an examinee file. Also, the question-answer pair and partial score association unit 14 generates a file with a set of marked results of multiple examinees attached as an examine file. The generated file is notified to each examinee or each marker via the network 50.

These functions of the image processing apparatus 10 are implemented with software resources in cooperation with hardware resources. More specifically, as described above, the CPU 101 reads the control program implementing the function of the image processing apparatus 10 from the ROM 102 onto the RAM 103 and then executes the control program. The CPU 101 thus implements these functions.

In the exemplary embodiment, the answer reading unit 11 has a function of an acquisition unit. The question-answer pair region detector 12 and the partial score recognition unit 13 have a function as a recognition unit. The question-answer pair and partial score association unit 14 and the marked result aggregating unit 15 have a function as an associating unit.

FIG. 4 illustrates an example of a marked examination paper of the exemplary embodiment. The examination paper of FIG. 4 may be considered as a rectangular coordinate system. The top left corner of the examination paper is defined as the origin O, the x axis extends rightward from the origin O, and the y axis extends downward from the origin O. A position in the horizontal direction of the examination paper thus represents an x coordinate, and a position in the vertical direction of the examination paper thus represents a y coordinate.

The examination paper includes entry columns for a date of examination, an examination subject, the name of the examinee, a examinee number, a total score of the examination paper (the total score of the examination paper as a result of marking by a marker) on the top portion of the examination paper. The entry columns are filled in by the examinee and the marker. Four question-answer pairs responsive to questions 1 through 4 are arranged in the y axis direction. Each examinee writes the answer below the respective question. The partial score regions are arranged on the right end portion of the examination paper. The marker marks the answer, and writes the partial score in the partial score region in response to the question-answer pair.

FIG. 4 illustrates the four question-answer pairs. The number of question-answer pairs written is not limited to a particular number in the examination paper of the exemplary embodiment. The number of question-answer pairs may be varied on a per examination paper basis. The partial score responsive to the question-answer pair may be written at any location in the partial score region and is thus separately written from the question-answer pair. In other words, the location where the partial score is written is not specified in advance on a per question-answer pair basis. Each marker writes the partial score responsive to each question-answer pair written on the examination paper.

Figure 5:
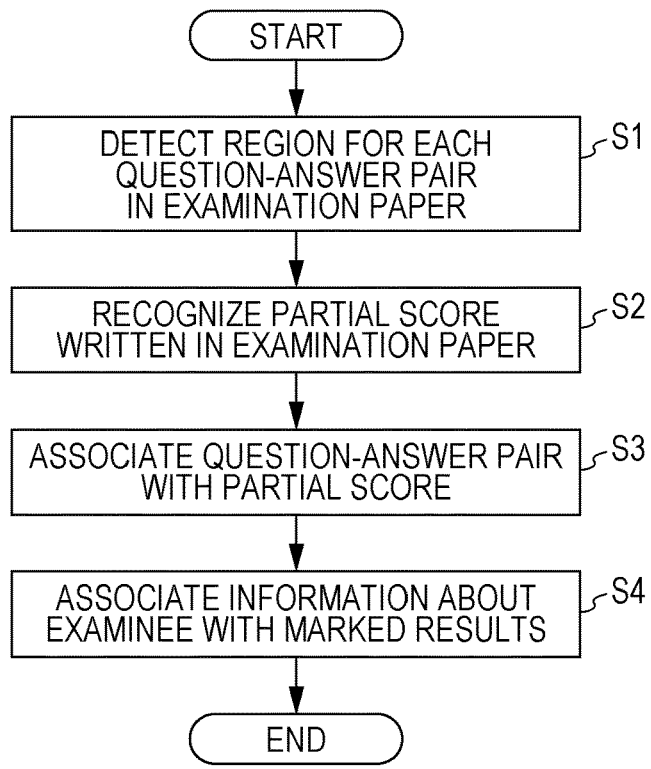
FIG. 5 is a flowchart illustrating an example of a series of operations performed by the image processing apparatus.

A series of operations performed by the image processing apparatus 10 is described below. FIG. 5 is a flowchart illustrating an example of a series of operations performed by the image processing apparatus 10.

First, an examinee takes an examination and writes an answer to a question in the examination paper of the examination. A marker then marks the examination paper, and the marked examination paper is placed onto the image processing apparatus 10. The answer reading unit 11 reads the image formed on the marked examination paper placed on the image processing apparatus 10.

After the image formed on the marked examination paper is read, the question-answer pair region detector 12 detects the region of each question-answer pair in the examination paper from the read image (first process S1). The image processing apparatus 10 recognizes the partial score written in the examination paper from the read image (second process S2).

The question-answer pair and partial score association unit 14 associates the question-answer pair detected in the first process S1 with the partial score recognized in the second process S2 (third process S3). Although the partial score described in the examination paper is recognized in the second process S2, it is not clear at this point of time which question-answer pair the recognized partial score corresponds to. In the third process S3, the question-answer pair and partial score association unit 14 recognizes which question-answer pair the recognized partial score corresponds to, and thus associates the question-answer pair with the partial score. The marked result aggregating unit 15 associates information related to the examinee with the marked results (fourth process S4). The processes thus end.

The processes of FIG. 5 performed with the examination paper of FIG. 4 placed on the image processing apparatus 10 are described in detail.

Figure 6:
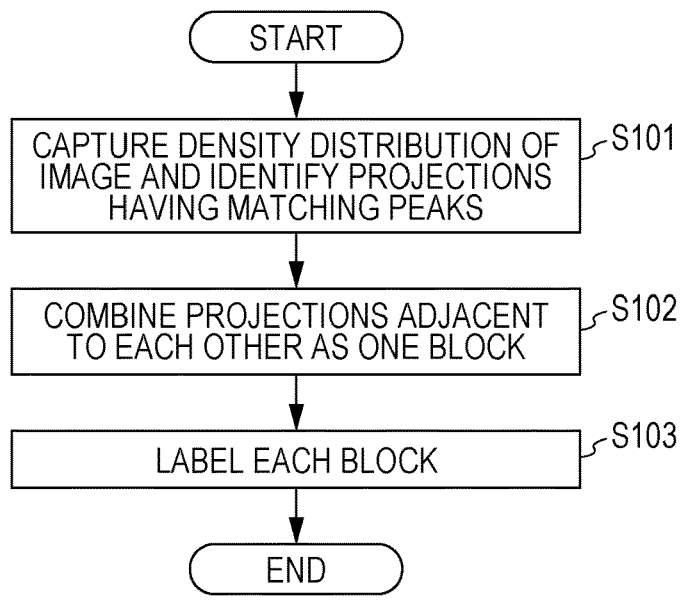
FIG. 6 is a flowchart illustrating an operation in a first process.

The first process S1 of FIG. 5 is described more in detail. FIG. 6 is a flowchart illustrating an example of a procedure of the first process S1. At a default state, the marked examination paper is placed on the image processing apparatus 10, and the answer reading unit 11 reads the image formed in the placed examination paper.

When the answer reading unit 11 reads the image, the question-answer pair region detector 12 detects a density distribution of the read image in vertical and horizontal directions, and identifies a location where a density peak in the vertical direction and a density peak in the horizontal direction overlap (hereinafter the location is referred to as a "projection") (step S101). Since characters gather in an area where a question and an answer to the question are written, that area indicates a higher density value in color density than in an area where nothing is written. By detect the density distributions in the vertical and horizontal directions, a region having each question written therewithin and a region having each answer written therewithin are identified as a projection.

The question-answer pair region detector 12 combines adjacent projections from among identified projections into a single block (step S102). The projections identified in step S101 include a region having a question written therewithin and a region having an answer written therewithin. In step S102, a question and an answer to the question (namely, the question-answer pair) are combined into the same block.

A question and an answer to the question are close to each other, but the question-answer pairs are spaced from each other on the examination paper of FIG. 4. For example, question 1 and the answer to question 1 are close to each other. Since there is a space below the answer to question 1, the first question-answer pair and the second question-answer pair are spaced apart. From among the identified projections identified in step S101, projections falling within a predetermined distance are determined to be close to each other and combined into the same block in step S102. In this way, one block is set up for each question-answer pair, and a region for each question-answer pair is thus detected.

The question-answer pair region detector 12 tags each block with a label (step S103). The label uniquely identifies each block. For example, the topmost block on the examination paper is labeled "1". The blocks below the topmost block are labeled "2" and subsequent numbers successively. The first process S1 is thus complete.

Figure 7:
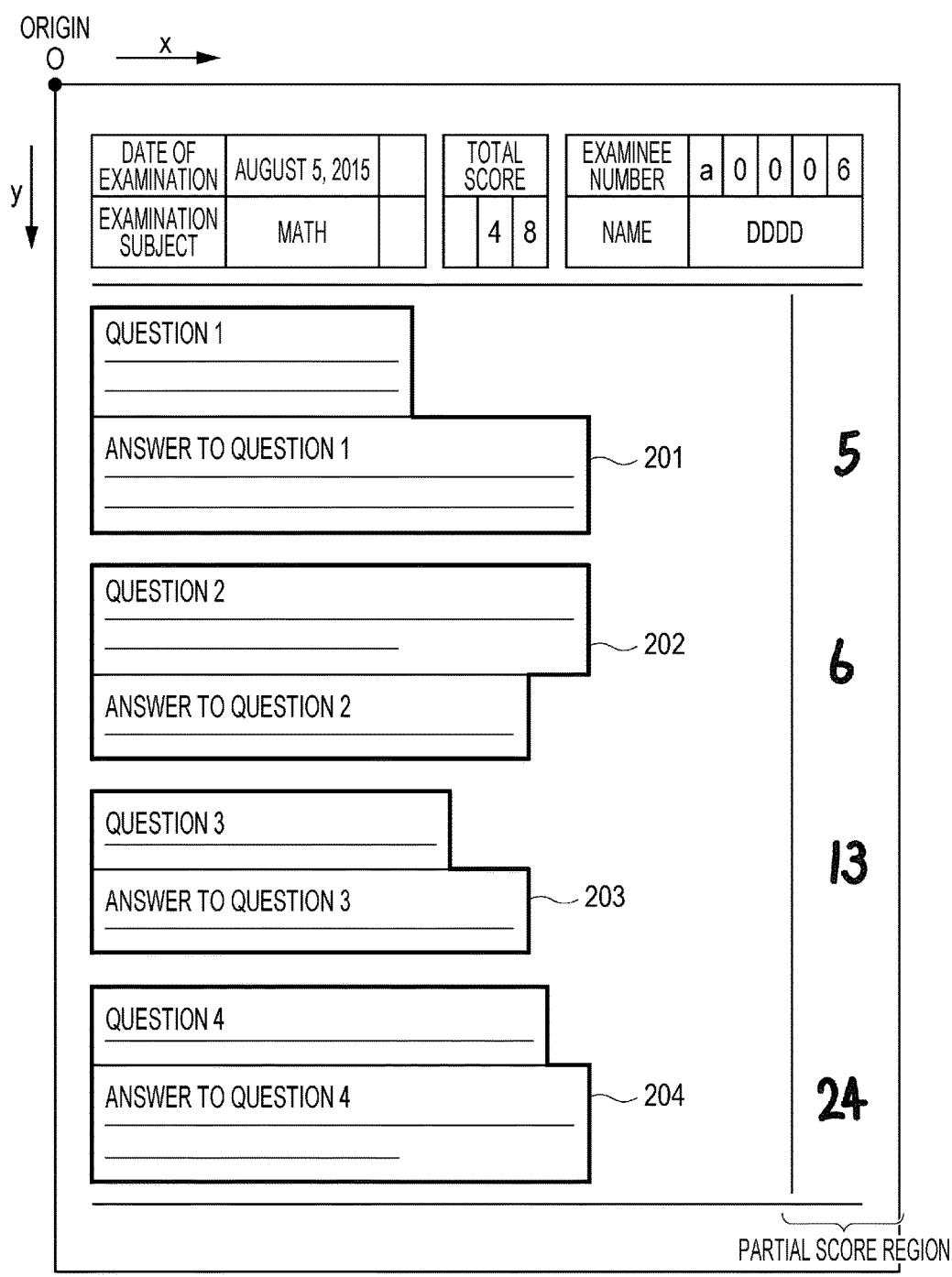
FIG. 7 illustrates an example of blocks configured in the first process.

FIG. 7 illustrates an example of blocks configured in the first process S1. Referring to FIG. 7, the blocks are configured on the examination paper of FIG. 4. The examination paper includes four question-answer pairs responsive to four questions, and a block is formed for each of the four question-answer pairs. More specifically, a block 201 is set up as a region for question 1, and a block 202 is set up as a region for question 2. A block 203 is set up as a region for question 3, and a block 204 is set up as a region for question 4.

In the process of FIG. 6, the question-answer pair region detector 12 measures the density distributions in the vertical and horizontal direction, and detects the region of each question-answer pair by handling adjacent projections as the same block. The exemplary embodiment is not limited to this method. A process of the question-answer pair region detector 12 to detect the region of each question-answer pair is to be predetermined in the exemplary embodiment, but the present invention is not limited to a process in which the density distribution is measured, and adjacent projections are combined to detect the region of each question-answer pair.

In the examination paper, words "question 1" or "question 2" may be set to be larger, or expressed in bold or red color different from the color of other characters. The region of each question-answer pair may be detected in accordance with the bold font, the size, or the color of characters. More specifically, a region between a character string in a bold font, and a next character sting in a bold font may be detected as the region of a single question-answer pair.

In the examination paper, the question-answer pair may be numbered, such as "question 1" or "question 2". The region of each question-answer pair may be detected based on the question-answer pair number. For example, the OCR may recognize the character string "question" and a number next to it, and the region between the recognized number and the next number may be detected as the region of a single question-answer pair.

In the examination paper, the question may be typed while the answer may be hand-written by the examinee. The region of the typed area may be determined to be the region of the question, and the region of hand-written area may be determined to be the region of the answer. The region of each question-answer pair may be thus determined. More specifically, the region of the typed area and the region of the hand-written area right below the type area may be detected as the region of one question-answer pair.

A border may be drawn for each question-answer pair in the examination paper. The image of the examination paper is scanned horizontally and vertically, and a line along which black pixels are consecutively chained along a predetermined length or more is recognized as a border. A region delineated by the border may be detected as the region for each question-answer pair.

An answer column may be in a rectangular table format in the examination paper. In such a case, the region of each question-answer pair may be recognized on the assumption that the question-answer pair is written in each rectangular field. More specifically, a space between a rectangular area and a next rectangular area may be detected as a region of one question-answer pair.

If the sentence as an answer is written horizontally in the examination paper, the leftmost characters of the left ends of the sentences are left aligned, but the right ends at the rows may not be aligned. A region where the leftmost characters are aligned but the rightmost characters are not aligned may be considered as the region of answer. The region of each question-answer pair is detected.

Figure 8:
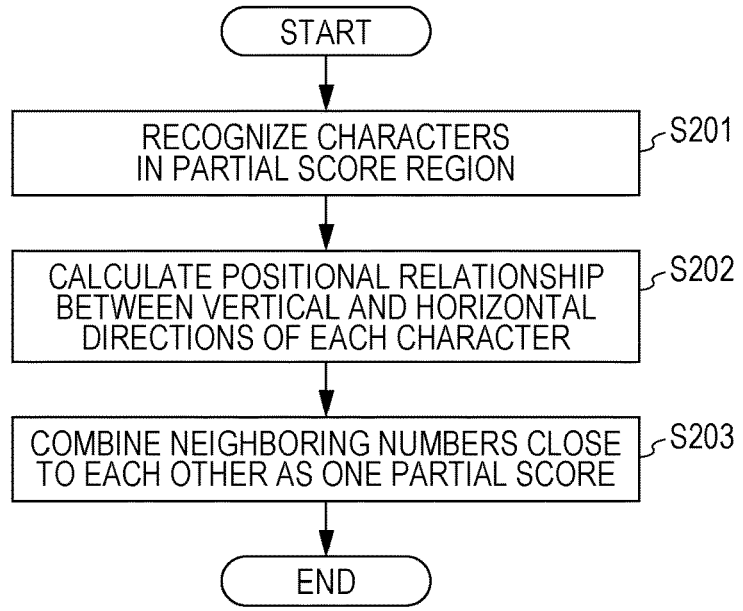
FIG. 8 is a flowchart illustrating operations in a second process.

The second process S2 of FIG. 5 is described below more specifically. FIG. 8 is a flowchart illustrating an example of a procedure of the second process S2.

The partial score recognition unit 13 recognizes characters in the partial score region through the OCR (step S201) after the region of each question-answer pair is detected in the examination paper in the first process S1. The partial score recognition unit 13 calculates the positional relationship in the vertical direction and horizontal direction between the recognized characters (step S202). The partial score recognition unit 13 calculates coordinate information of each character in the image of the examination paper (namely, x coordinate and y coordinate), as the positional relationship between the characters.

The partial score recognition unit 13 combines adjacent numbers into a single partial score in accordance with the positional relationship of each character (step S203). For example, if the marker writes "10" in the partial score region to give a partial score of 10 points, the numbers "1" and "0" are separately recognized through the OCR. A distance serving as a criteria is predetermined in each of the x axis direction and y axis direction. If the distance between the two numbers "1" and "0" falls within the distance criteria in each of the x axis direction and y axis direction, the two numbers are determined to be close to each other, and then combined into a single number. More specifically, "1" and "0" are determined to be "10", and a partial score of 10 points is thus recognized. The process thus ends.

Referring to FIG. 4, numbers "5", "6", "13", and "24" are described in the partial score regions. The partial score recognition unit 13 recognizes six written numbers "5", "6", "1", "3", "2", and "4" using the OCR. For example, the distance between "5" and "6" is too large in the y axis direction, and the distance between the two numbers is longer than the distance criteria. The two numbers are treated as separate numbers (partial scores).

Concerning "1" and "3", there is almost no difference in y coordinates, and the two numbers are close to each other in the x axis direction. The distance between two numbers in each of the x axis direction and y axis direction falls within the distance criteria. "1" and "3" are thus combined into a single number "13" and recognized as a partial score of 13 points. Similarly, "2" and "4" are combined into a single number "24", and are recognized as a partial score of 24 points.

If a strikeout line is drawn across any number, that number may not be counted as a partial score in the recognition of the partial number. If a number is described with a minus symbol, such as "−5", that number may be recognized as a partial score. A character, such as an alphabet, rather than a number, may be recognized as a partial score.

Figure 9:
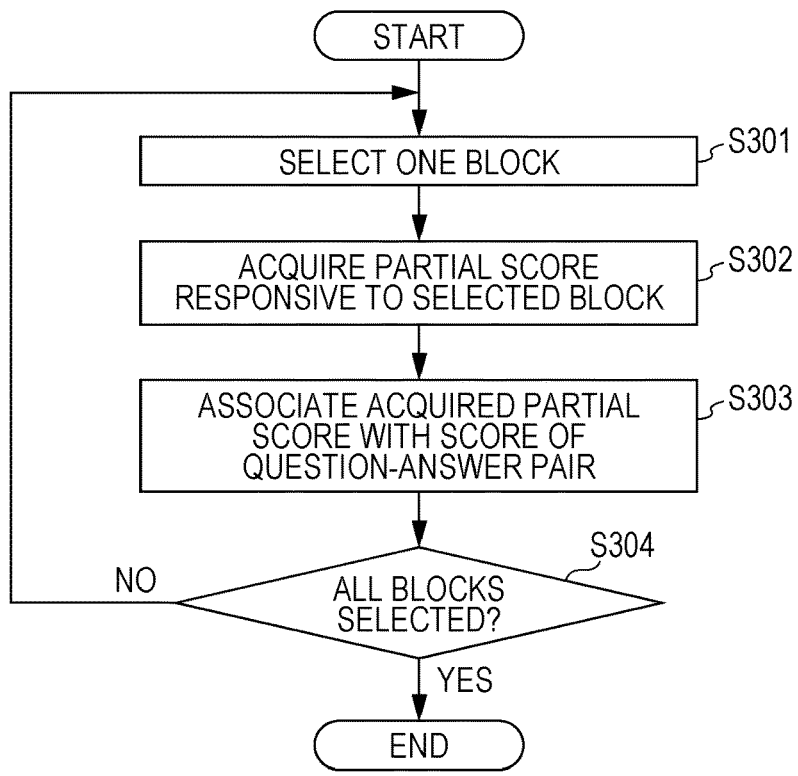
FIG. 9 is a flowchart illustrating operations in a third process.

The third process S3 of FIG. 5 is specifically described below. FIG. 9 illustrates an example of the procedure of the third process S3.

Subsequent to the recognition of the partial score in the second process S2, the question-answer pair and partial score association unit 14 selects one of the blocks configured in the first process S1 (step S301). The question-answer pair and partial score association unit 14 acquires the partial score responsive to the selected block (step S302).

The question-answer pair and partial score association unit 14 identifies the partial score region corresponding to the selected block. In other words, the question-answer pair and partial score association unit 14 identifies another region that satisfies a predetermined condition with respect to the region of the selected block.

Figure 10:
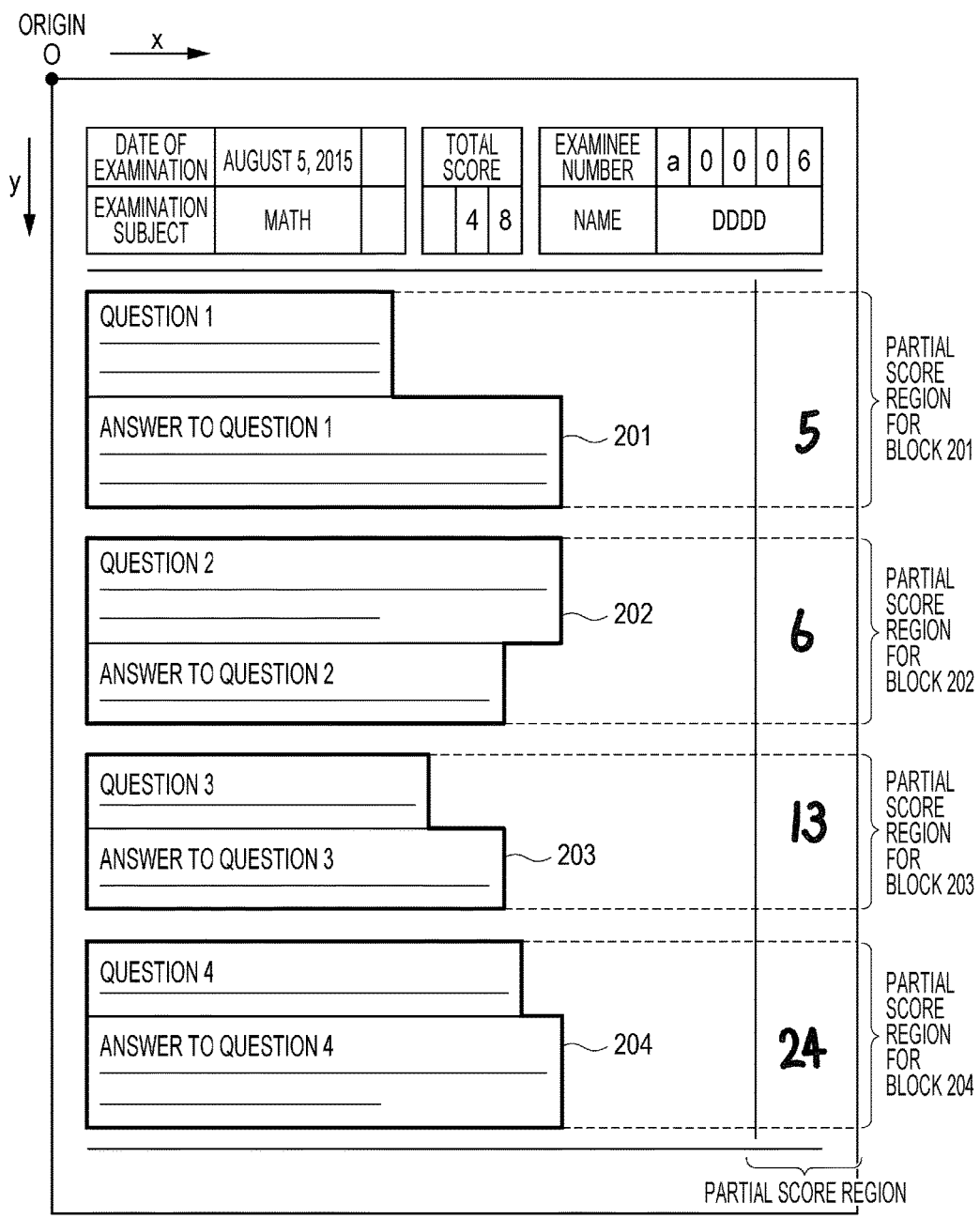
FIG. 10 illustrates an example of partial score regions responsive to blocks.

FIG. 10 illustrates an example of the partial score region corresponding to the block. Referring to FIG. 10, there are illustrated blocks configured on the examination paper of FIG. 4. The blocks are laid out in a vertical direction in the examination paper, and the partial score regions are laid out on the right side of the examination paper. The question-answer pair and partial score association unit 14 delineates each partial score region, as illustrated in FIG. 10 by broken lines, block by block according the length of the block in the vertical direction to identify each partial score region corresponding to each block. In the examination paper, each block is extended horizontally (in the x axis direction) to intersect the partial score region. The resulting intersected region is thus identified as another region that satisfies the predetermined condition with respect to the region of the block.

The question-answer pair and partial score association unit 14 acquires the partial score described in the identified region as a partial score responsive to the selected block.

The question-answer pair and partial score association unit 14 associates the acquired partial score as the score of question-answer pair of the selected block (step S303). The question-answer pair and partial score association unit 14 determines whether all blocks have been selected (step S304). In response to an affirmative determination (yes) in step S304, the process ends. In response to a non-affirmative determination (no) in step S304, processing returns to step S301 where the question-answer pair and partial score association unit 14 selects a block that remains unselected.

Recognized as scores are "5", "6", "13", and "24" on the examination paper of FIG. 10. The question-answer pair and partial score association unit 14 recognizes that "5" is written in the partial score region of block 1, and associates 5 points with the partial score of the question-answer pair of block 1 (question 1). Similarly, the question-answer pair and partial score association unit 14 associates 6 points, 13 points, and 24 points respectively with the partial scores of the question-answer pair of block (question 2), the question-answer pair of block 3 (question 3), and the question-answer pair of block 4 (question 4).

Each block is extended horizontally to identify the partial score region corresponding thereto as illustrated in FIG. 10. In such a case, a partial score region between block 201 and block 202 belongs to no block. Such a partial score region between block 201 and block 202 may be equally divided between block 201 and block 202 such that any partial score region belonging to no block may not be generated. If a partial score region belonging to no block is created, a partial score written in that region may be associated with a block closest to the partial score.

If no partial score is written in the partial score region corresponding to the block, the partial score at the block may be regarded as 0 point. If multiple partial scores are present for a single block, the sum of the multiple partial scores may be regarded as the partial score for that block.

Figure 11:
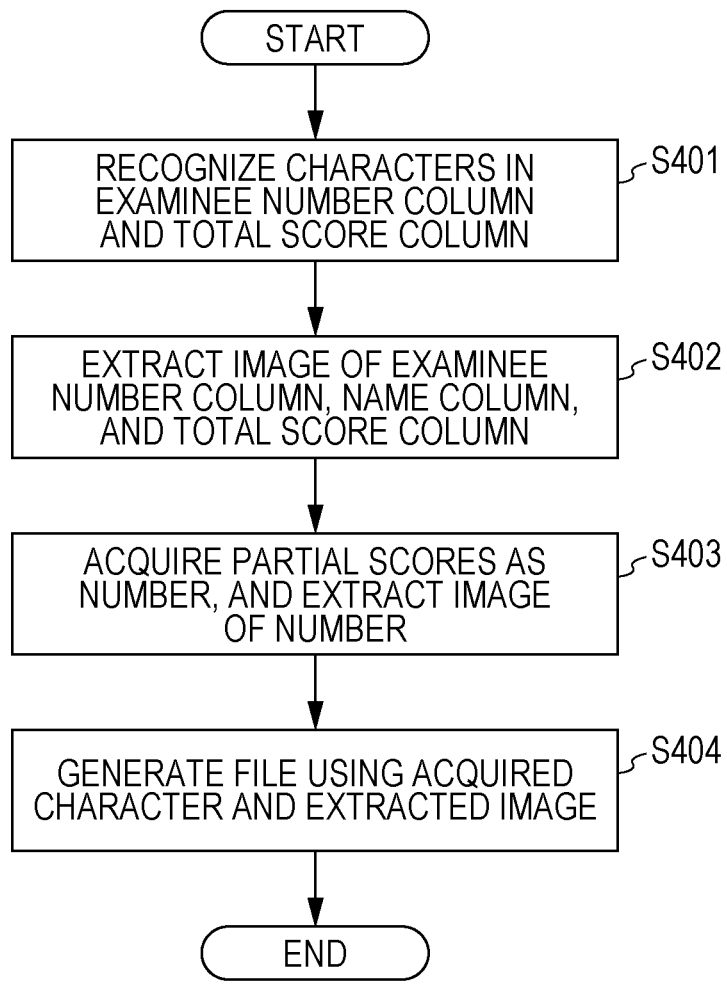
FIG. 11 is a flowchart illustrating operations in a fourth process.

The fourth process S4 of FIG. 5 is specifically described. FIG. 11 is a flowchart illustrating an example of the procedure of the fourth process S4.

With the partial score associated with the respective question-answer pair in the third process S3, the marked result aggregating unit 15 reads identification information embedded as QR code (registered trademark) in the examination paper. The identification information indicates information of the format of the examination paper, and determines where a name column, an examinee number column, and a total score column are present within the examination paper. Based on the read identification information, the marked result aggregating unit 15 recognizes characters written in the examinee number column and characters in the total score column in the examination paper through the OCR (step S401).

In accordance with the read identification information, the marked result aggregating unit 15 extracts the image of the characters in the examinee number column, the name column, and the total number column (step S402). The marked result aggregating unit 15 acquires the number recognized in the second process S2, and extracts the image of the number as the partial score (step S403). The marked result aggregating unit 15 generates a file to be transmitted to each examinee and each marker, using the characters (numbers) acquired (recognized) through steps S401 through S403 and the extracted image (step S404).

Note that the characters in the examinee number column and the characters in the total score column are recognized in step S401. In step S402, the image of hand-written characters in the examinee number column, the name column, and the total score column is extracted. In step S403, the number as the partial score in each question-answer pair is acquired, and the image of the hand-written numbers is extracted. In step S404, the characters acquired and the image of the hand-written characters extracted through steps S401 through S403 attached on a per examinee basis in a file is generated as an examinee file. Also, for example, the characters acquired and the image of the hand-written characters extracted through steps S401 through S403 attached for multiple examinees in a file is generated.

The generated file is transmitted to the examinee terminal apparatus 20, the marker terminal apparatus 30, or the management server 40 via the network 50. The examinee may view the examinee file on the examinee terminal apparatus 20, and checks the marked results of the examination paper of his or her own. The marker views the marker file on the marker terminal apparatus 30, and checks the marked results of the examination paper of each examinee. The file may be uploaded to the management server 40 such that the marked results may be viewed on the examinee terminal apparatus 20 or the marker terminal apparatus 30. The process thus ends.

FIG. 12 is an example of a file of a marker generated in the fourth process S4. The "aggregate process results" indicate whether the acquisition of the characters and the attaching of the image have been successfully performed. The "examinee number" indicates the number assigned to each examinee. The image on the right-hand side ("examinee number (image)") is an image of hand-writing extracted from the examination paper in step S402. The characters on the left-hand side ("examinee number (OCR)") are characters that are recognized from the image on the right-hand side using the OCR in step S401. The "name (image)" indicates the name of each examinee, and is an image of hand-writing extracted from the examination paper in step S402.

The "total score" represents a total score of the examination paper. The image on the right-hand side ("total score (image)") is an image of the hand-writing extracted from the examination paper in step S402. The number on the left-hand side ("total score (OCR)") represents the number that is recognized from the image on the right-hand side by the OCR in step S401. FIG. 12 also indicates the partial scores "score 1", "score 2", "score 3", and "score 4" in this order, which respectively represent the partial scores to questions 1 through 4. The "score 1" indicates a partial score to question 1, the right image ("score 1 (image)") is an image of the hand-writing extracted from the partial score region in the examination paper in step S403, and the left number ("score 1 (OCR)") indicates the number that is recognized from the right image through the OCR.

In the fourth process S4, the information concerning an examinee is associated with the marked results. More specifically, a file indicating a partial score for each question-answer pair written in the examination paper is output. The examinee and marker may view the partial score responsive to each question-answer pair.

In the fourth process S4 of FIG. 5, the marked result aggregating unit 15 may compare the value of the total score recognized through the OCR from the examination paper with the sum of the partial scores through the OCR from the examination paper, and may notify the marker that the value of the total score is different from the sum of the partial scores if the two values are different.

The marked result aggregating unit 15 may set up a criteria. If an examinee has a partial score recognized from the examination paper lower than the criteria, the examinee name column may be highlighted by coloring the examinee name column in the file for the marker.

The marked result aggregating unit 15 may re-arrange the number sequence of the examinees and the total score sequence in a specific field before outputting the marker file.

If there are multiple partial scores with respect to a single question-answer pair, the marked result aggregating unit 15 may sum the multiple scores and record the sum as a partial score of that question-answer pair. Alternatively, the marked result aggregating unit 15 may record each of the partial scores in the file.

As described above, in accordance with the exemplary embodiment, the image processing apparatus 10 reads the image formed in the marked examination paper, and detects the region of each question-answer pair from the read image. The image processing apparatus 10 then recognizes the partial score written in the examination paper, associates the recognized partial score with one of the question-answer pairs, and then notifies the examinee and the marker of the marked results.

The exemplary embodiment is free from specifying the location of character recognition on each question-answer pair in advance when the partial score is recognized on each question-answer pair. The image processing apparatus 10 automatically detects the region of each question-answer pair from the image on the examination paper, and then automatically associates the question-answer pair with the partial score.

In accordance with the exemplary embodiment, the partial score region is located at the rightmost side of the examination paper. The exemplary embodiment is not limited to this arrangement. The partial score region may be located at the leftmost side of the examination paper. If the partial score region is located at the leftmost side of the examination paper, each block is extended horizontally (in the x axis direction) and the resulting intersected area is treated as a partial score region corresponding to the block in the same manner as illustrated in FIG. 10.

The partial score region may be located at the top side or the bottom side of the examination paper. If the question-answer pairs are sequentially vertically arranged (in the y axis direction) in the examination paper as illustrated in FIG. 4, the region of each question-answer pair is spaced from the partial score region. The question-answer pair and partial score association unit 14 selects the question-answer pairs one by one from the top, the partial scores written in the partial score regions one by one, and then associates the selected question-answer pair with the partial score. The question-answer pair and partial score association unit 14 thus associates the question-answer pair with the partial score.

Figure 13:
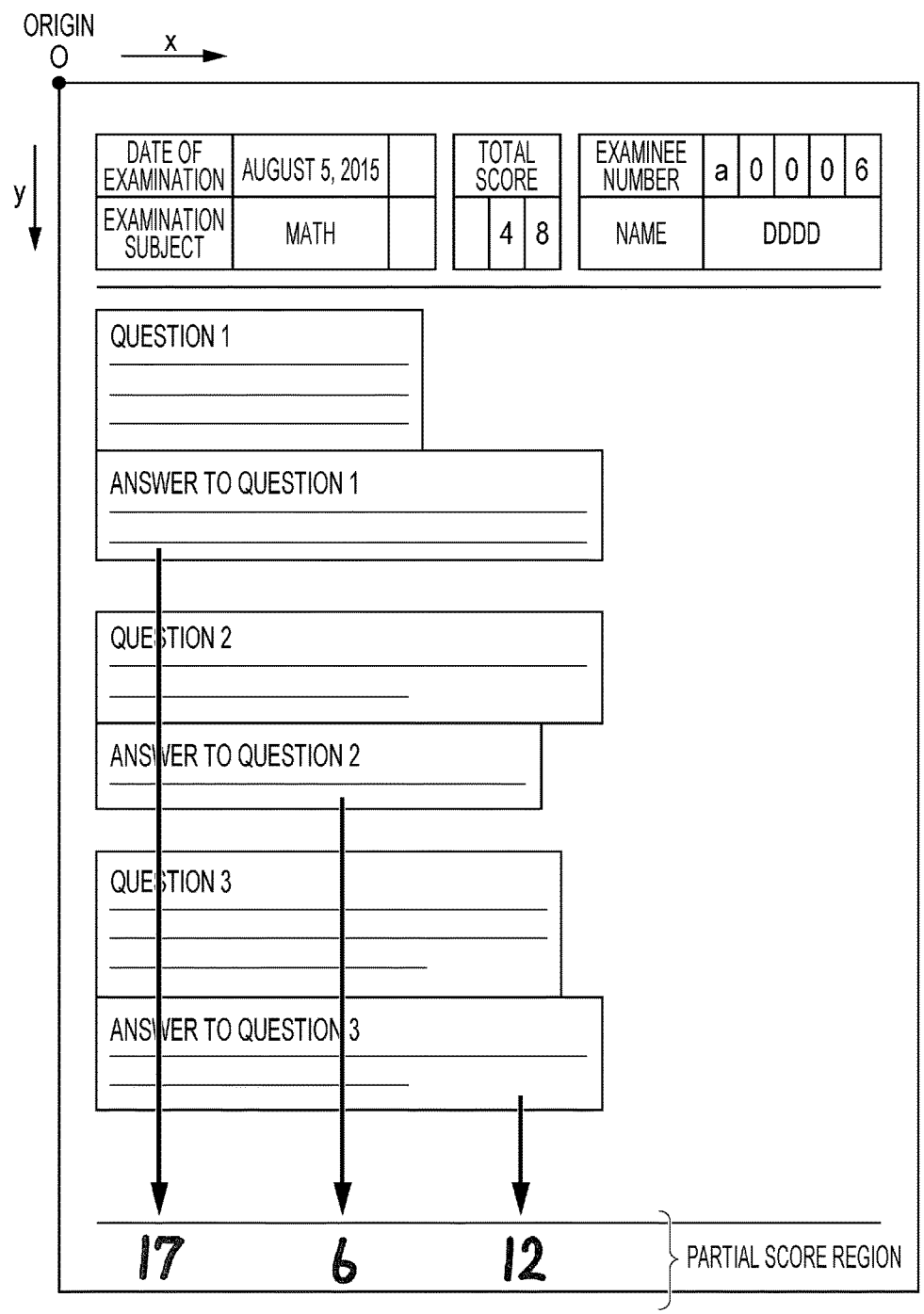
FIG. 13 illustrates an example in which partial score regions are located at the bottom of the examination paper.

FIG. 13 illustrates an example in which a partial score region is located at the bottom of the examination paper. In the examination paper of FIG. 13, three question-answer pairs for questions 1 through 3 are arranged vertically (in the y axis direction). Three partial scores "17", "6", and "12" are written in the partial score region at the bottom of the examination paper. The question-answer pair and partial score association unit 14 associates a partial score of "17" at the leftmost partial score region with question 1 at the topmost question-answer pair in the examination paper, thereby setting the partial score to question 1 to be 17 points. Next, the question-answer pair and partial score association unit 14 associates a partial score of "6" on the right of "17" with question 2 below question 1, thereby setting the partial score to question 2 to be 6 points. Finally, the question-answer pair and partial score association unit 14 associates a partial score of "12" on the right of "6" with question 3 below question 2, thereby setting the partial score to question 3 to be 12 points.

Even if the region of the question-answer pair is spaced from the partial score region, the question-answer pair is associated with the partial score by setting up a rule in advance according to which the question-answer pair is associated with the partial score in accordance with the positional relationship between the question-answer pair and the partial score. The example illustrated in FIG. 13 is based on the premise that one partial score is provided for one question-answer pair.

The partial score region may not necessarily have to be laid out in the examination paper in the exemplary embodiment. The partial score recognition unit 13 may perform an OCR operation in the entire examination paper, read the number written alone in the examination paper, and recognize the number as the partial score. The number as the partial score may be written in a size smaller than other characters, such as of the question, or may be written in color different from color of the other characters, for example, in blue. The partial score may thus recognized in accordance with the size or color of the characters.

Even if no partial score region is arranged, the partial score may be recognized by setting up a process to recognize the partial score in advance. If the partial score is recognized with no partial score region arranged, the recognized partial score may be associated with a region closest to that partial score.

In accordance with the exemplary embodiment, both the question and the answer are written on the examination paper. The questions and the answers to them may be written on separate sheets. For example, the answers may be written on a paper sheet different from the paper sheet of the questions, and the marker may write the partial scores on the sheet having the answers written thereon. In such a case, a block is set up for a single answer, and a partial score corresponding to the block is acquired. As described above, if each answer is delineated by a border or the answer columns are arranged in a rectangular table, the region of each question-answer pair is detected on a per border basis or on a per answer column basis. The region is thus associated with the partial score.

In accordance with the exemplary embodiment, the marker calculates the total score by summing the partial scores of the question-answer pairs. The marker may not have to calculate the total score, but the image processing apparatus 10 may calculate the total score. In such a case, the image processing apparatus 10 recognizes the partial scores through the OCR, and calculates the total score by summing the recognized partial scores. In this arrangement, the time the marker takes in marking is reduced in comparison with the case that the marker calculates the total score. When the image processing apparatus 10 calculates the total score, a partial score read through OCR may be in error, leading to an erratic total score. If the image processing apparatus 10 attaches the number as the partial score recognized through the OCR and the image of the hand-written number to the marker file, the marker may verify that there is no error in the recognition of the partial score through the OCR, and makes sure that the total score is not in error.

In accordance with the exemplary embodiment, the examinee solves the question and writes the answer to be marked by the marker, and the marker writes the partial score as a result of marking the examination paper. In other words, the answer and the partial score are written by separate users who have different purposes. More specifically, the answer is written in the examination paper through the operation of the examinee, and the partial score is written in the examination paper through the operation of the marker. The answer and the partial score are written for different purposes, and are thus based on different attributes. The examination paper thus has two different attributes.

In accordance with the exemplary embodiment, the marked examination paper is read. The original document is not limited to a marked examination paper. As long as multiple entry items serving as evaluation target items and one or more entry remarks evaluating and responsive to one of the entry items are written on an original document, and each entry remark is associated with one of the entry items, any original document is acceptable.

Figure 14:
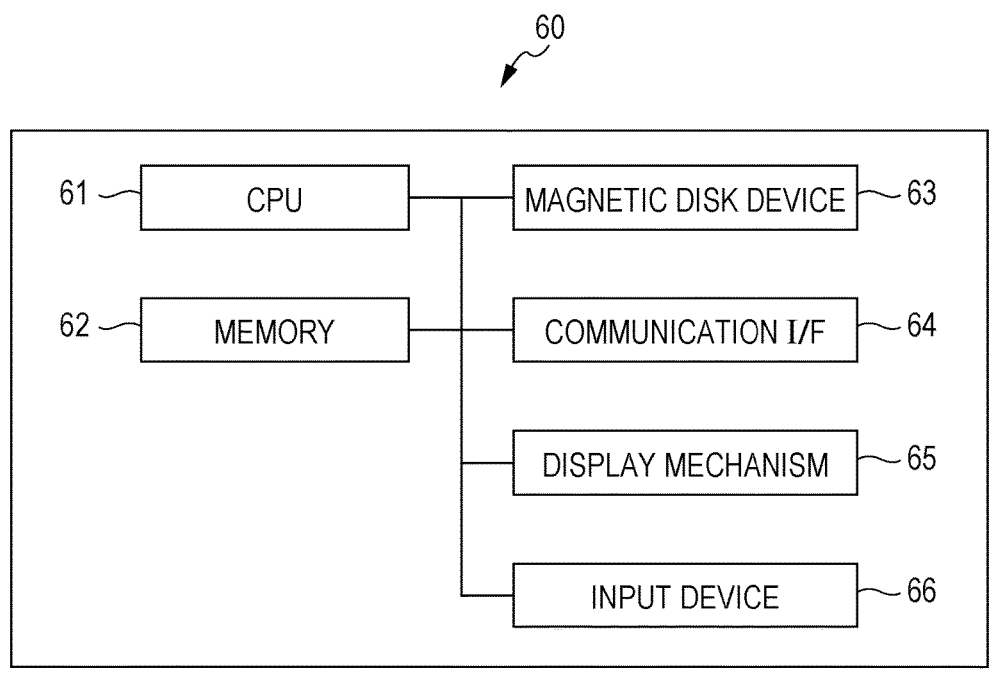
FIG. 14 illustrates a hardware configuration of a computer to which the exemplary embodiment is applied.

The first through fourth processes S1 through S4 performed by the image processing apparatus 10 of the exemplary embodiment may be implemented using a general-purpose computer. The processes may now be implemented using a computer 60. The hardware of the computer 60 is described below. FIG. 14 illustrates a hardware configuration of the computer 60 to which the exemplary embodiment is applied.

The computer 60 includes a central processing unit (CPU) 61 serving as an arithmetic computing unit, a memory 62 as a storage unit, and a hard disk device (HDD) 63. The CPU 61 executes a variety of programs including an operating system (OS), and applications. The memory 62 is a memory area configured to store a variety of programs and data for use in executing the programs. The magnetic disk device 63 stores a program configured to implement the functions of FIG. 3. The program is loaded onto the memory 62, and the CPU 61 performs a process responsive to the program. The functions of FIG. 3 are thus implemented.

The computer 60 includes a communication interface (I/F) 64 for communication with the outside, a display mechanism 65 including a video memory and a display, and an input device 66, such as a keyboard or a mouse.

More specifically, in response to an instruction from the CPU 61, the computer 60 detects the region at each question-answer pair in the examination paper, recognizes the partial score, associates the question-answer pair with the partial score, and associates the information related to each examinee with the marked results.

The program implementing the exemplary embodiment of the present invention may be supplied not only through communication but also by a recording medium, such as compact disk read-only memory (CD-ROM).

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus, comprising:
    a processor programmed to:
        acquire image information of an image of an original document;
        recognize from the acquired image information each of a plurality of entry items and an entry remark written differently from the plurality of entry items, included in the image; and
        associate the entry remark with one of the entry items in accordance with a relationship between a location of the recognized entry items and a location of the recognized entry remark;
    wherein each of the plurality of entry items is recognized by:
        capturing a density distribution of the acquired image information in vertical and horizontal directions;
        identifying a plurality of projections, a projection being a location where a density peak in the horizontal direction and a density peak in the vertical direction overlap; and
        combining adjacent projections among the identified plurality of projections into a single block, the single block corresponding to one of the plurality of entry items.

2. The information processing apparatus according to claim 1, wherein the processor is programmed to:
    acquire the image information of the image including character information; and
    in accordance with a predetermined rule, recognize a region where each of the entry items included in the image is written; and
    in accordance with the character information of the image, recognize the entry remark written separately from the region where each of the entry items is written.

3. The information processing apparatus according to claim 1, wherein the processor is programmed to recognize the entry remark present in an area predetermined as an area where the entry remark associated with one of the entry items is written.

4. The information processing apparatus according to claim 1, wherein the processor is programmed to associate with the entry item the entry remark present within another region that satisfies a predetermined condition with reference to the region where the entry item is written.

5. The information processing apparatus according to claim 1, wherein the processor is programmed to associate the entry remark with the entry item closest to the location of the entry remark from among the entry items.

6. The information processing apparatus according to claim 1, wherein the processor is programmed to output, for each of the entry items, the entry remark that is associated with the entry item.

7. The information processing apparatus according to claim 1, wherein
the entry item includes a portion written by a single user, and the entry remark is written in an operation performed by another user.

8. The information processing apparatus according to claim 1, wherein
the entry item comprises at least one of a question and an answer to the question, and the entry remark comprises a score evaluating the entry item.

9. An information processing method, comprising:
acquiring image information of an image of an original document;
recognizing from the acquired image information each of a plurality of entry items and an entry remark written differently from the plurality of entry items, included in the image; and
associating the entry remark with one of the entry items in accordance with a relationship between a location of the recognized entry items and a location of the recognized entry remark;
wherein each of the plurality of entry items is recognized by:
capturing a density distribution of the acquired image information in vertical and horizontal directions;
identifying a plurality of projections, a projection being a location where a density peak in the horizontal direction and a density peak in the vertical direction overlap; and
combining adjacent projections among the identified plurality of projections into a single block, the single block corresponding to one of the plurality of entry items.

10. A non-transitory computer readable medium storing a program causing a computer to execute a process for processing information, the process comprising:
acquiring image information of an image of an original document;
recognizing from the acquired image information each of a plurality of entry items and an entry remark written differently from the plurality of entry items, included in the image; and
associating the entry remark with one of the entry items in accordance with a relationship between a location of the recognized entry items and a location of the recognized entry remark;
wherein each of the plurality of entry items is recognized by:
capturing a density distribution of the acquired image information in vertical and horizontal directions;
identifying a plurality of projections, a projection being a location where a density peak in the horizontal direction and a density peak in the vertical direction overlap; and
combining adjacent projections among the identified plurality of projections into a single block, the single block corresponding to one of the plurality of entry items.

* * * * *